Nov. 30, 1926. Re. 16,491

A. R. CLAS

WINDOW CONTROL MECHANISM

Original Filed Feb. 8. 1924 3 Sheets-Sheet 1

Inventor

Angelo Robert Clas

By Owen & Owen

Attorneys

Nov. 30, 1926. Re. 16,491

A. R. CLAS

WINDOW CONTROL MECHANISM

Original Filed Feb. 8, 1924 3 Sheets-Sheet 2

Inventor

Angelo Robert Clas

By Owen & Owen

Attorney

Nov. 30, 1926. Re. 16,491

A. R. CLAS

WINDOW CONTROL MECHANISM

Original Filed Feb. 8 1924 · 3 Sheets-Sheet 3

Inventor

Angelo Robert Clas

By Owen & Owen

Attorneys

Reissued Nov. 30, 1926. Re. 16,491

UNITED STATES PATENT OFFICE.

ANGELO ROBERT CLAS, OF TOLEDO, OHIO, ASSIGNOR TO THE TOLEDO AUTOMOTIVE PRODUCTS COMPANY, A CORPORATION OF OHIO.

WINDOW-CONTROL MECHANISM.

Original No. 1,535,988, dated April 28, 1925, Serial No. 691,347, filed February 8, 1924. Application for reissue filed March 10, 1926. Serial No. 93,764.

This invention relates to a raising and lowering means for windows of the type commonly used in the doors of closed motor vehicles, and has for its object the provision of a highly efficient and easily operable device of this character which is composed of a minimum number of parts, is inexpensive in its construction and is capable of being easily and quickly installed as a unit in a door or window frame.

Further objects and advantages of the invention will be apparent from the following detailed description thereof. While the invention in its broader aspect is capable of embodiment in numerous forms, two embodiments only thereof are illustrated in the accompanying drawings, in which—

Figure 1:
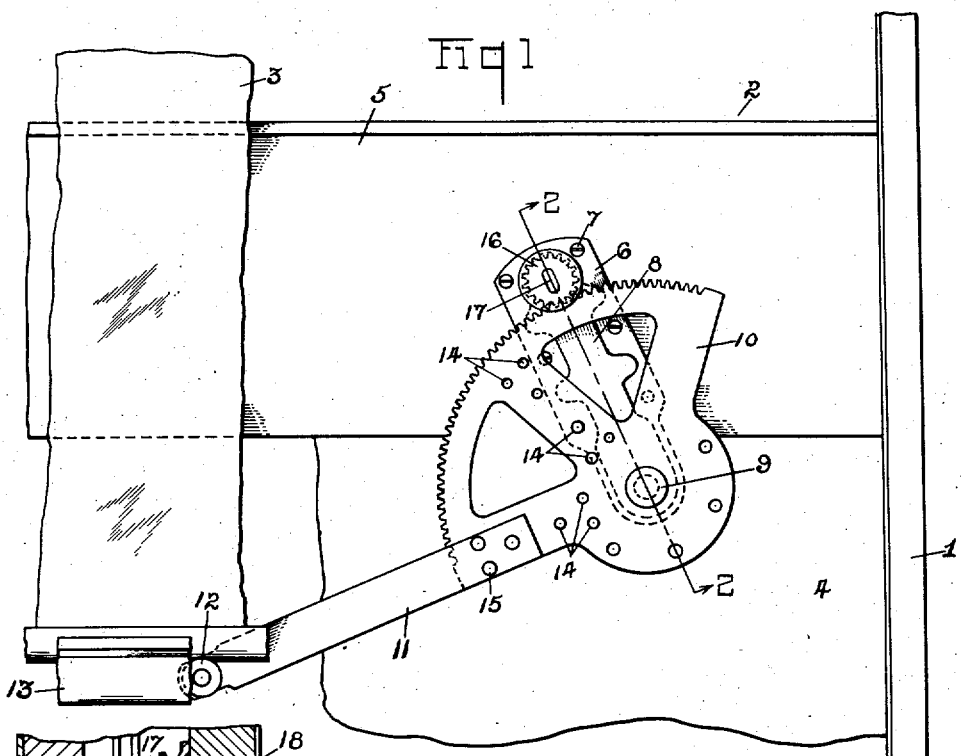
Figure 2:
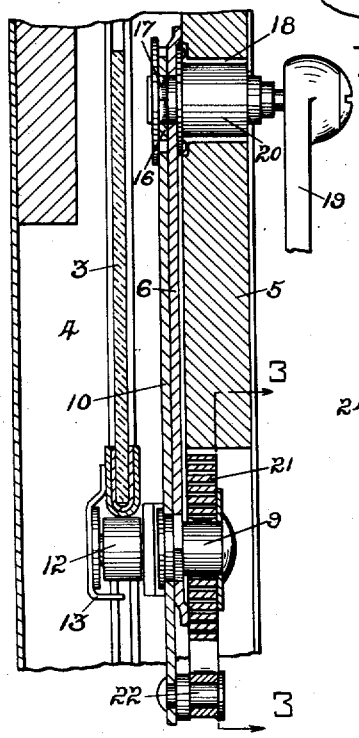
Figure 3:
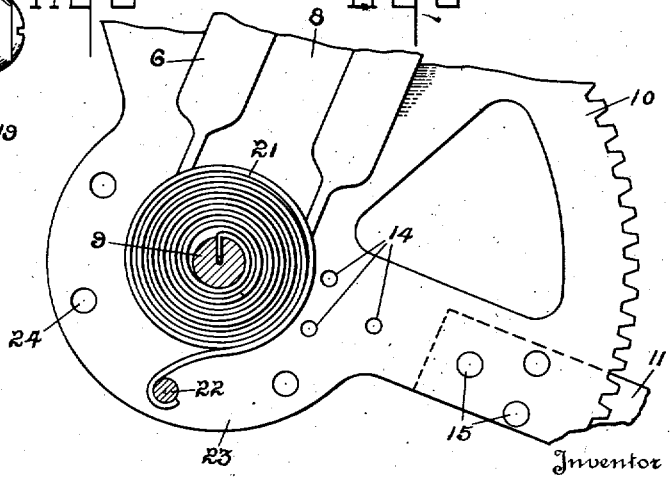
Figure 4:
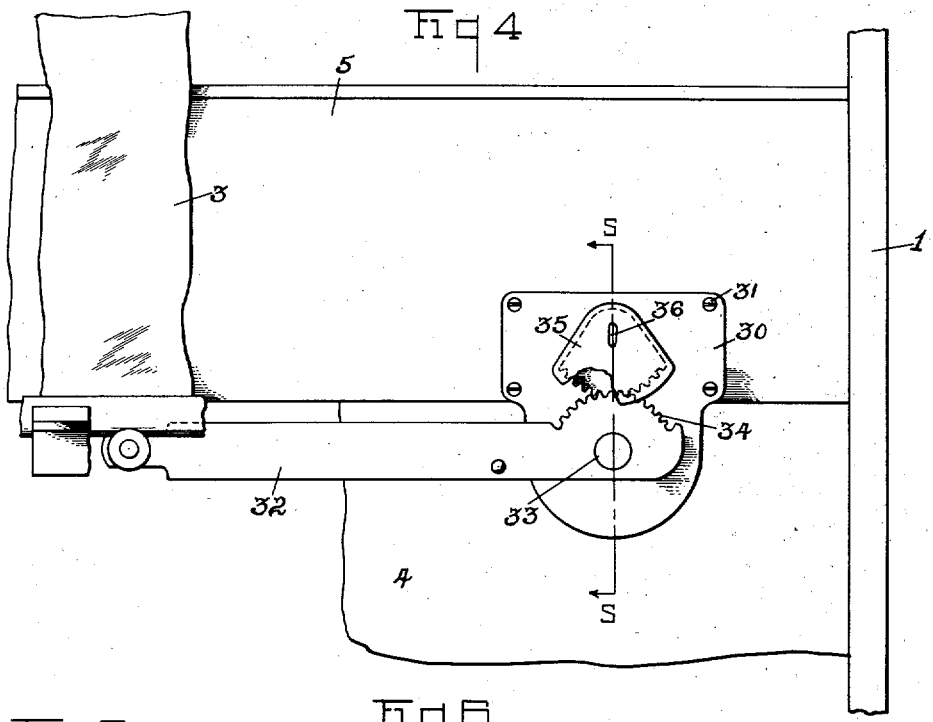
Figure 5:
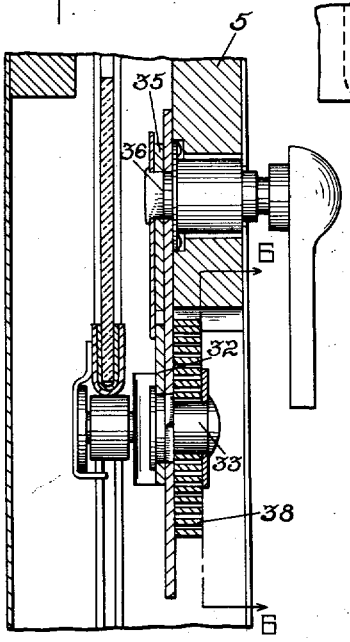
Figure 6:
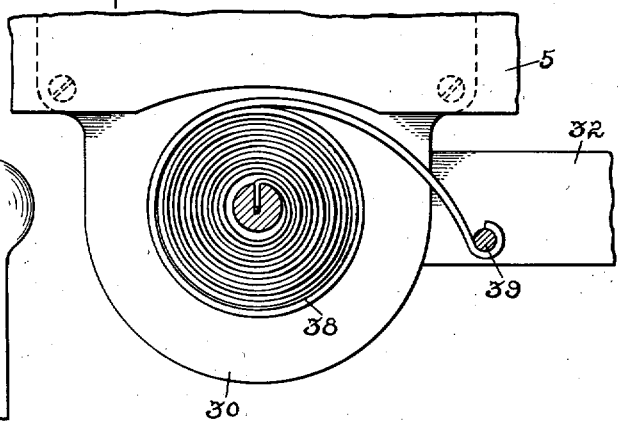
Figures 7, 8:
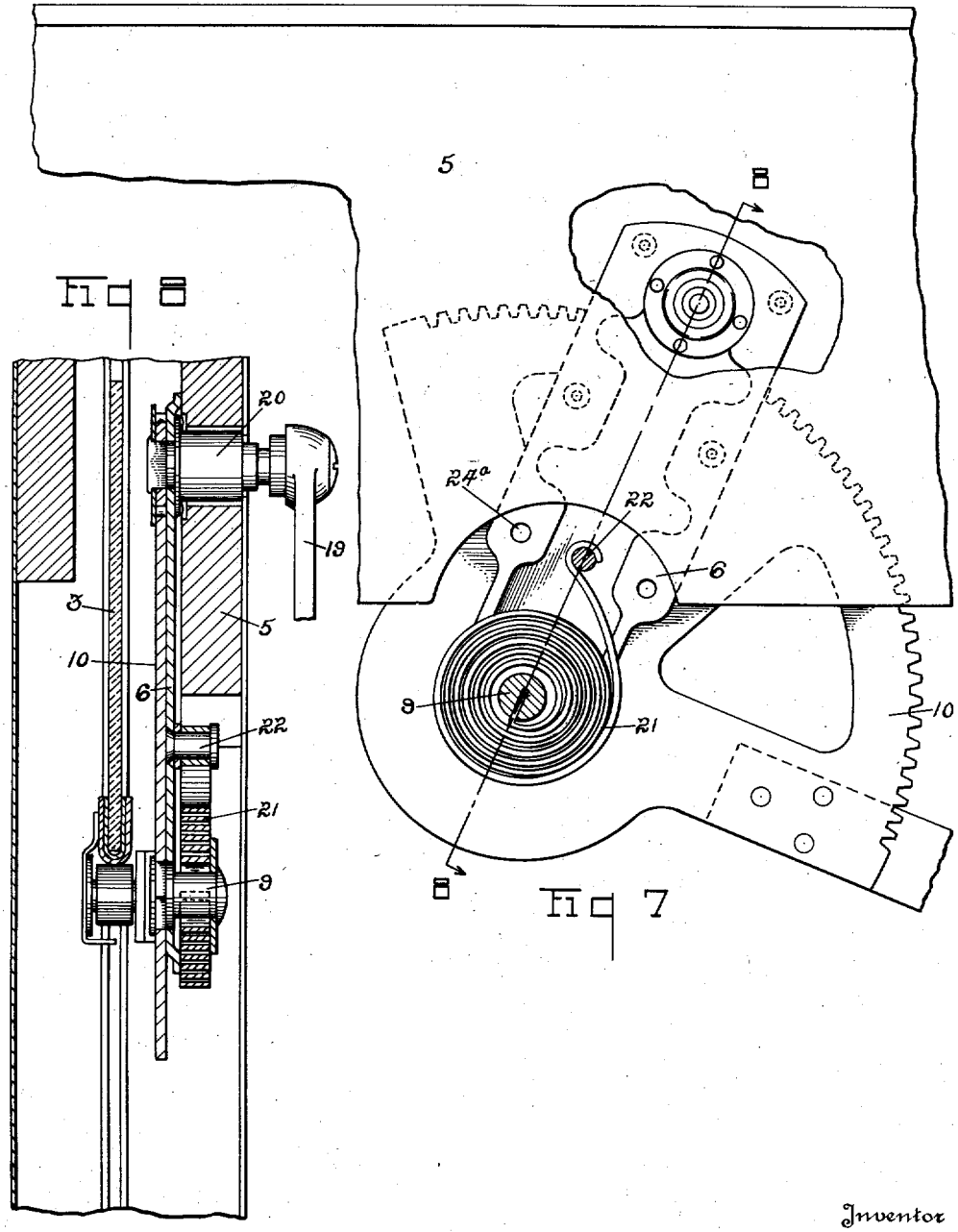

Figure 1 is a fragmentary view of a closed vehicle door equipped with one form of the invention and with the window member shown in lowered position. Fig. 2 is an enlarged section on the line 2—2 in Fig. 1 with parts in full. Fig. 3 is a fragmentary section on the line 3—3 in Fig. 2. Fig. 4 is a view similar to Fig. 1 with the door equipped with a slightly different form of the invention and with the window in partly lowered position. Fig. 5 is an enlarged fragmentary section on the line 5—5 in Fig. 4. Fig. 6 is a section on the line 6—6 in Fig. 5. Fig. 7 is a fragmentary view similar to Fig. 3 with the inner end of the spring attached to the segment and its outer end attached to the bracket plate, and Fig. 8 is a section on the line 8—8 in Fig. 7.

Referring to the drawings, 1 designates a door or window frame of the type commonly used in closed motor vehicles and having the window opening 2 in its upper portion adapted to be closed by a glass or window member 3, which when open lowers into a well 4 provided in the frame 1 below the opening 2. The frame 1 is provided with the customary lock-board 5 at the inner side of the upper portion of the well 4.

In the embodiment of the invention, shown in Figs. 1, 2 and 3, 1 designates a bracket or body plate which is rigidly secured to the inner side of the lock-board 5 by screws 7, or in any other suitable manner, and is of oblong form projecting, in the present instance, at its lower end below the lock-board 5. This plate is preferably composed of light stock, and in order to add strength is provided with a depressed longitudinally extending portion 8. A pivot stud 9 is fixedly mounted in the lower end portion of the plate 6 below the lower edge of the lock-board 5 and has one end projecting from the plate in opposition to the lock-board 5 and forming a journal on which a segmental gear 10 is mounted for free turning movements. The gear 10 is preferably stamped from sheet metal and lies flat at its inner side against the plate 6, being retained on the stud 9, in the present instance, by a flanging of the stud.

An arm 11, which is also preferably stamped from sheet metal, projects radially from the gear segment 10, being fixed at one end to one end portion of the segment and having its opposite or free end provided with a roller 12 on which the lower edge of the glass or window member 3 rests. It is apparent that raising and lowering movements of the arm 11, upon a turning of the segment 10, will effect or permit corresponding raising and lowering movements of the glass or window member 3, and that the roller 12 will travel a distance along the lower edge of the window member during such movements. A guard 13 projects from the lower edge of the glass or window member 3 and underlies the roller 12 to retain it in engagement with the window member during the raising and lowering movements thereof and to cause a downward movement of the arm to effect a positive lowering of the window member. It is preferable to make the arm 11 in a separate piece from the segment 10, both for the purpose of saving material in manufacture and for the purpose of enabling the arm to be adjustably attached to the segment 10 to suit the particular job in connection with which the control means is to be used. The adjustment of the arm is taken care of by providing a plurality of sets of holes 14 in the segment 10 through which the securing rivets 15 of the arm may be projected. In the present instance, four sets of holes 14 are provided, two sets in radially spaced relation at one end of the segment, and two in radially spaced relation at the center portion of the segment.

The drive means for the segment 10 comprises a pinion 16, which meshes with the teeth of the segment and is carried by a shaft 17 that is journaled for turning movements in the upper end portion of the plate 6. The shaft 17 projects out through an opening 18 in the lock-board 5 and receives an operating handle 19 at its outer end. The enlargement 20 on the shaft 17 encloses a locking mechanism which has nothing to do with the present invention and need not, therefore, be described. The outer side of the pinion 16 with respect to the plate 6 is flanged to lap the edge of the segment 10 and serve to retain such segment in flat engagement with the side of the plate 6, or, in other words, to prevent an outward bending of the segment from engagement with the drive pinion.

In order to counterbalance the weight of the window member 3, the control means includes a coiled spring 21 of the clock or convolute type, which is mounted on an end of the stud shaft 9 at the opposite side of the plate 6 to the segment 10 and has its inner end fixed against turning to said shaft. The spring 21 lies flat against the adjacent side of the plate 6, in the present instance, below the lockboard 5 and within the confines or outer edges of the segment 10 and has its outer end attached to a pin 22 on the enlarged hub portion 23 of the segment 10. For the purpose of adjusting the tension of the spring 21, the pin 22 is adapted to be placed in any one of a series of holes 24, provided in spaced relation in the hub portion 23 concentrically of its center. In Figs. 7 and 8 the pivot stud 9 is shown as fixed to the segment 10 instead of to the bracket plate 6, so that the inner end of the spring 21 is attached to the segment, while the outer end of the spring is adjustably attached to the plate 6 by the pin 22 being inserted in one of a series of holes 24[a] in the plate.

In the form of the invention illustrated in Figs, 4, 5 and 6, 30 designates the bracket plate, which is preferably of thin sheet metal and secured to the inner side of the lockboard 5 by screws 31, or in any other suitable manner, with its lower end projecting below the lock-board. The window member operating arm 32 is mounted for free turning movements on a pivot 33 secured to the lower portion of the plate 30, and the arm has a segmental set of gear teeth 34 formed on its upper edge in concentric relation to the swinging axis of the arm. The segmental pinion 35 is mounted on an operating shaft 36 which is journaled in the plate 30 above the pivot 33 and projects outward therefrom through the lockboard 5 and carries an operating handle 37 at its outer end. The pinion 35 is flanged to overlap the meshing portion of the segment 34 to retain the latter in engagement therewith. In this form of the invention, the segments 34 and 35 are of the same size so that a partial turning of the operating handle 37 will impart a full throw to the arm 32, whereas in the form of the invention first described several turns of the operating handle are required for the same purpose. A convolute or clock type of spring 38 is used, it being mounted on an extended end of the pivot 33 at the opposite side of the plate 30 to the arm 32 and having its outer or free end attached to a pin 39 on the arm 32.

It is apparent that in both forms of the invention, the control device is composed of a minimum number of parts and that the entire unit construction may be extremely light and inexpensive to manufacture and adapted to be mounted in a small space. It is also evident that the form and manner of mounting the spring adds to the efficiency and compactness of the device and is an important feature.

The first form of the invention is used on higher class jobs than the second form and also where the space in which the control handle is operated is limited, as the first form requires a much shorter operating handle than the second form.

I wish it understood that my invention is not limited to any particular construction, arrangement or form of the parts as it is capable of numerous modifications and changes without departing from the spirit of the claims.

Having thus described my invention, what I claim as new, and desire to secure by Letters Patent is:

1. A window control mechanism comprising a bracket adapted to be secured to and extend below the lockboard of a vehicle door, a transverse pivot stud on said bracket and spaced from an edge of the lock board, an operating member pivoted on said stud, a window engaging arm on said member, a convolute spring encircling said stud below the lock board and having one end fixed to the stud, said spring being mounted in close juxtaposition to said bracket with one face thereof substantially flush with said bracket, connecting means on the operating member for the opposite end of the spring, and means to actuate said operating member.

2. A window control mechanism consisting of a unitary construction comprising a bracket adapted to be secured to and extend below the lock board of a vehicle door, a transverse pivot stud fixed to said bracket and spaced from an edge of the lock board, a gear sector pivoted on said stud, a window engaging arm secured to said sector, a convolute spring encircling said stud below the lock board and having one end fixed to the stud, said spring being mounted in close juxtaposition to said bracket, a pinion on said bracket meshing with said sector for operation thereof, and a plurality of abutments on said sector for selectively receiving one end of said spring for adjusting the tension thereof.

3. A window control of the class described having a bracket plate member, a pivot stud carried by the plate member and projecting beyond both sides thereof, a flat sheet metal gear sector member mounted on the stud in close relation to one side of the plate member, the sector member having its peripheral portion braced against lateral deflecting movements in one direction by the plate member, said sector member having a window engaging arm projecting therefrom, means carried by the plate member for operating the sector member and having a pinion in mesh with the sector member, means disposed at the outer side of the pinion of said operating means and lapping the side of the sector member adjacent the point of meshing of the pinion therewith and cooperating with the plate member to retain the pinion and sector member in meshing engagement, a convolute spring encircling the stud in close relation to the side of the plate member opposed to the sector member and fixed at its inner end to the stud, one of said members being fixed to the stud which is free to turn in the other, and the outer end of the spring being anchored to the member which is free to turn on the stud.

4. A window control of the class described having a bracket plate, a gear sector pivoted to said bracket plate and having a window engaging arm projecting therefrom, means carried by the plate and having a pinion in mesh with said sector, means disposed at the outer side of the pinion and forming with said bracket plate a space approximately equal to the thickness of the sector into which the rim of the sector projects, and a counterbalance spring for said sector on the side of the plate opposed to said sector.

5. A window control of the class described having a bracket plate member, a pivot stud carried by the plate member and projecting beyond both sides thereof, a gear sector member on the stud having a window engaging arm projecting therefrom, means carried by the bracket plate member for operating the sector member including a pinion in mesh with the sector member, means associated with the operating means for overlapping the outer marginal edge portion of the sector member and providing with said bracket plate member a space approximately equal to the thickness of the sector member whereby the bracket plate member braces one side of the sector member against lateral deflecting movements and said overlapping means braces the other side of the sector member, and a counterbalance spring on said stud on the side of the bracket plate member opposed to the sector member.

In testimony whereof I have hereunto subscribed my name to this specification.

ANGELO ROBERT CLAS.